United States Patent [19]

Mori et al.

[11] Patent Number: 5,124,435
[45] Date of Patent: Jun. 23, 1992

[54] POLYESTER COPOLYMER FROM TEREPHTHALIC ACID GLYCOL AND CYCLOALIPHATIC DIOL

[75] Inventors: Hiroshi Mori; Naoki Yamamoto, both of Otake; Hitoshi Iwasaki; Noriyuki Taziri, both of Toyohashi, all of Japan

[73] Assignee: Mitsubishi Rayon Co., Ltd., Tokyo, Japan

[21] Appl. No.: 571,538

[22] PCT Filed: Dec. 28, 1989

[86] PCT No.: PCT/JP89/01325

§ 371 Date: Aug. 28, 1990

§ 102(e) Date: Aug. 28, 1990

[87] PCT Pub. No.: WO90/07534

PCT Pub. Date: Jul. 12, 1990

[30] Foreign Application Priority Data

Dec. 28, 1988 [JP] Japan ................... 63-334861

[51] Int. Cl.$^5$ .............. C08G 63/02; C08G 63/18
[52] U.S. Cl. .................. 528/307; 528/308.6; 528/308.7
[58] Field of Search ........... 528/176, 193, 194, 272, 528/307, 308.6, 308.7

[56] References Cited

U.S. PATENT DOCUMENTS

| | | | |
|---|---|---|---|
| 2,901,466 | 8/1959 | Kibler et al. | 528/288 |
| 4,045,431 | 8/1977 | Fagerburg | 528/295 |
| 4,093,603 | 6/1978 | Jackson, Jr. et al. | 528/307 |
| 4,246,381 | 1/1981 | Robeson | 525/444 |
| 4,363,908 | 12/1982 | Joyner et al. | 528/307 |
| 4,398,022 | 8/1983 | Sublett | 528/302 |
| 4,551,520 | 11/1985 | Morris et al. | 528/302 |

*Primary Examiner*—John Kight, III
*Assistant Examiner*—T. Mosley
*Attorney, Agent, or Firm*—Oblon, Spivak, McClelland, Maier & Neustadt

[57] ABSTRACT

Disclosed is a polyester copolymer obtained by reacting (A) a dicarboxylic acid component composed mainly of terephthalic acid or a derivative thereof with (B) a glycol component comprising (B-1) at least 0.5 mole % but less than 15 mole % of an aliphatic diol having 2 to 16 carbon atoms and (B-2) more than 85 mole % but not more than 99.5 mole % of 1,4-cyclohexanedimethanol having a trans form content of at least 80 mole %. This polyester copolymer has a high rate of crystallization and provides a shaped article having a high heat resistance.

4 Claims, No Drawings

POLYESTER COPOLYMER FROM TEREPHTHALIC ACID GLYCOL AND CYCLOALIPHATIC DIOL

DESCRIPTION

1. Technical Field

The present invention relates to a polyester copolymer having a high rate of crystallization and providing a shaped article having a high heat resistance.

2. Background Art

Polycyclohexylenedimethylene terephthalate obtained from terephthalic acid and 1,4-cyclohexanedimethanol has a high melting point, and therefore, a molded article obtained from this polymer has a high heat resistance.

In this polymer, as the amount of the trans form of 1,4-cyclohexanedimethanol is increased, the melting point becomes high and the heat resistance of a molded article obtained from this polymer is enhanced, but the glass transition temperature also becomes high and the rate of crystallization is reduced. Accordingly, when it is desired to obtain a molded article having a required heat resistance by using polycyclohexylenedimethylene terephthalate comprising a large proportion of the trans form of 1,4-cyclohexanedimethanol, a problem arises of a narrowing of the applicable range of shaping conditions, such as the mold temperature.

DISCLOSURE OF THE INVENTION

An object of the present invention is to provide a polyester copolymer having a high rate of crystallization and providing a shaped article having a high heat resistance.

In accordance with the present invention, there is provided a polyester copolymer obtained by reacting (A) a carboxylic acid component composed mainly of terephthalic acid or a derivative thereof with (B) a glycol component comprising (B-1) at least 0.5 mole % but less than 15 mole % of an aliphatic diol having 2 to 16 carbon atoms and (B-2) more than 85 mole % but not more than 99.5 mole % of 1,4-cyclohexanedimethanol having a trans form content of at least 80 mole %.

BEST MODE FOR CARRYING OUT THE INVENTION

The dicarboxylic acid component (A) used in the present invention preferably comprises at least 90 mole % of terephthalic acid or a derivative thereof. As the derivative of terephthalic acid, there can be mentioned dialkyl terephthalates having 1 to 10 carbon atoms in the alkyl group and diaryl terephthalates having 6 to 14 carbon atoms in the aryl group. As specific examples of the derivative of terephthalic acid, there can be mentioned dimethyl terephthalate, diethyl terephthalate, dipropyl terephthalate, dibutyl terephthalate and diphenyl terephthalate.

As the other dicarboxylic acid used in an amount of up to 10 mole % in combination with terephthalic acid or the derivative thereof as the dicarboxylic acid component, there can be mentioned phthalic acid, isophthalic acid, adipic acid, sebacic acid, naphthalene-1,4-dicarboxylic acid and naphthalene-2,6-dicarboxylic acid.

The glycol component (B) used in the present invention comprises (B-1) at least 0.5 mole % but less than 15 mole % of an aliphatic diol having 2 to 16 carbon atoms and (B-2) more than 85 mole % but not more than 99.5 mole % of 1,4-cyclohexanedimethanol in which the trans form content is at least 80 mole %.

As the aliphatic diol (B-1) having 2 to 16 carbon atoms, there can be mentioned ethylene glycol, propylene glycol, tetramethylene glycol, hexamethylene glycol, neopentyl glycol, octamethylene glycol, butylethylpropanediol, diethylpropanediol and 3,9-bis(1,1-dimethyl-2-hydroxyethyl)-2,4,8,10-tetraoxaspiro[5,5]undecane. Ethylene glycol, propylene glycol, tetramethylene glycol and hexamethylene glycol are especially preferably used. These aliphatic diols can be used alone or in the form of a mixture of two or more thereof. An aliphatic diol having more than 16 carbon atoms is not preferred as the aliphatic diol because a polyester copolymer obtained by using this aliphatic diol does not give a shaped article having a satisfactory heat resistance.

The amount of the aliphatic diol (B-1) having 2 to 16 carbon atoms, used in the present invention, is at least 0.5 mole %, but less than 15 mole % based on the glycol component (B). A polyester copolymer in which the amount of the aliphatic diol (B-1) is smaller than 0.5 mole % based on the component (B) is not preferable because the rate of crystallization is low. Furthermore, a polyester copolymer in which the aliphatic glycol (B-1) occupies at least 15 mole % of the component (B) is not preferable because the melting point is low and little crystallization is caused.

In the 1,4-cyclohexanedimethanol used in the present invention, the content of the trans form must be at least 80 mole %. A shaped article obtained from a polyester copolymer prepared by using 1,4-cyclohexanedimethanol having a trans form content lower than 80 mole % does not have a satisfactory heat resistance.

The polyester copolymer of the present invention can be prepared by carrying out an esterification reaction or an ester exchange reaction by using terephthalic acid or a derivative of terephthalic acid such as dimethyl terephthalate, ethylene glycol or other aliphatic diol and 1,4-cyclohexanedimethanol composed mainly of the trans form as the starting materials, and subsequently, carrying out polycondensation.

Catalysts for use in the preparation of usual polyesters can be used for the esterification or ester exchange reaction and the polycondensation reaction.

Additives such as a flame retardant, a fibrous reinforcer, a filler, an antioxidant, a heat stabilizer, a colorant and an ultraviolet absorber can be added to the polyester copolymer of the present invention according to need.

The present invention will now be described in detail with reference to the following examples.

EXAMPLES 1 THROUGH 7 AND COMPARATIVE EXAMPLES 1 THROUGH 7

Terephthalic acid as the dicarboxylic acid and a glycol component comprising 1,4-cyclohexanedimethanol, ethylene glycol, 1,4-butanediol and 1,6-hexanediol at a ratio shown in Table 1 were subjected to esterification at 260° C. by adding 0.1% by weight, based on the weight of the final polymer, of tetrabutyl titanate as the esterification catalyst. Then antimony trioxide and phosphorous acid were added as the polycondensation catalyst in amounts of 0.03% by weight and 0.04% by weight, respectively, based on the weight of the final polymer, and polycondensation reaction was carried out at 285° to 320° C. under a reduced pressure, whereby various polyester copolymers shown in Table 1 were prepared. Each of the obtained polyester copolymers was recovered in the form of a strand, cooled with water, and cut into a pellet by a cutter.

The obtained polyester copolymer was decomposed with an aqueous solution of hydrazine, and the glycol component was analyzed by the gas chromatography. The results are shown in Table 1.

The obtained polyester copolymer was dissolved in phenol/tetrachloroethane (1/1 weight ratio) and the intrinsic viscosity $\eta sp/C$ was measured at a concentration of 0.5 g/dl. The results are shown in Table 1.

The obtained pellet was injection-molded into a molded article having a thickness of 6.4 mm, a length of 127 mm, and a width of 12.6 mm, at a cylinder temperature of 310° to 320° C. and a mold temperature of 70° C., by using a 1-ounce small-size injection molding machine. The heat distortion temperature (HDT) was measured as the index of the rate of crystallization according to ASTM D-648.

The melting point was measured by using a differential scanning calorimeter. From the results, it is understood that, when the ratio between 1,4-cyclohexanedimethanol and ethylene glycol in the polymer is within the specific range, and when the trans form content in 1,4-cyclohexanedimethanol exceeds the specific level, a product having a high melting point and a large HDT value can be obtained and this copolymer has well-balanced properties.

Furthermore, from Table 1, it is seen that an aliphatic diol having 4 or 6 carbon atoms is also effective.

TABLE 1

| | Transform content in CHDM (mole %) | Composition of glycol component (mole %) | | | | $\eta sp/C$ | Melting point (°C.) | HDT under load of 4.6 kg (°C.) |
|---|---|---|---|---|---|---|---|---|
| | | CHDM | EG | BG | HG | | | |
| Example 1 | 90 | 99 | 1 | — | — | 0.78 | 310 | 131 |
| Example 2 | 90 | 95 | 5 | — | — | 0.75 | 303 | 135 |
| Example 3 | 90 | 90 | 10 | — | — | 0.73 | 294 | 137 |
| Example 4 | 95 | 90 | 10 | — | — | 0.73 | 301 | 138 |
| Example 5 | 83 | 90 | 10 | — | — | 0.83 | 285 | 133 |
| Example 6 | 90 | 95 | — | 5 | — | 0.73 | 301 | 137 |
| Example 7 | 90 | 95 | — | — | 5 | 0.71 | 298 | 136 |
| Comparative Example 1 | 90 | 100 | — | — | — | 0.76 | 312 | 105 |
| Comparative Example 2 | 90 | 75 | 25 | — | — | 0.77 | 260 | 114 |
| Comparative Example 3 | 95 | 100 | — | — | — | 0.75 | 314 | 107 |
| Comparative Example 4 | 83 | 100 | — | — | — | 0.76 | 307 | 102 |
| Comparative Example 5 | 70 | 100 | — | — | — | 0.75 | 286 | 108 |
| Comparative Example 6 | 70 | 100 | — | — | — | 0.77 | 290 | 98 |
| Comparative Example 7 | 90 | 100 | — | — | — | 0.76 | 312 | 105 |

Note
CHDM: 1,4-cyclohexanedimethanol
EG: ethylene glycol
BG: 1,4-butanediol
HG: 1,6-hexanediol

INDUSTRIAL APPLICABILITY

The polyester copolymer of the present invention has a high rate of crystallization and a shaped article obtained from this copolymer has a high heat resistance. Accordingly, the range of utilization of the polyester resin shaped article is wider.

We claim:

1. A polyester copolymer obtained by reacting (A) a dicarboxylic acid component consisting essentially of terephthalic acid or a derivative thereof with (B) a glycol component comprising (B-1) at least 0.5 mole % but less than 15 mole % of an aliphatic diol having 2 to 16 carbon atoms and (B-2) more than 85 mole % but not more than 99.5 mole % of 1,4-cyclohexanedimethanol having a trans form content of at least 80 mole %.

2. A polyester copolymer as set forth in claim 1, wherein the derivative of terephthalic acid is a dialkyl terephthalate having an alkyl group having 1 to carbon atoms or a diaryl terephthalate having an aryl group having 6 to 14 carbon atoms.

3. A polyester copolymer as set forth in claim 1, wherein the aliphatic diol is ethylene glycol.

4. A polyester copolymer as set forth in claim 1, wherein the aliphatic diol is at least one member selected from the group consisting of propylene glycol, tetramethylene glycol and hexamethylene glycol.

* * * * *